United States Patent Office 3,478,060
Patented Nov. 11, 1969

3,478,060
PRODUCTION OF ACETALS OF METHYL-
GLYOXAL
Artur Maschke and Heinrich Pasedach, Ludwigshafen
(Rhine), Germany, assignors to Badische Anilin- &
Soda-Fabrik Aktiengesellschaft, Ludwigshafen (Rhine),
Germany
No Drawing. Filed Feb. 9, 1967, Ser. No. 614,814
Claims priority, application Germany, Feb. 15, 1966,
B 85,812
Int. Cl. C07d 13/04; C07c 43/30
U.S. Cl. 260—340.9                                4 Claims

ABSTRACT OF THE DISCLOSURE

A process for the production of acetals of methylglyoxal by reacting acetone with an alcohol and a nitrosating agent in the presence of acid catalysts.

---

This invention relates to a process for the production of acetals of methylglyoxal.

It is known from U.S. Patent Specification 2,421,559 that acetals of methylglyoxal can be produced by reacting methylglyoxal with alcohols in the presence of acids with simultaneous removal of the water formed. The starting material required, i.e. methylglyoxal or concentrated organic or aqueous solutions of methylglyoxal, is accessible for example by oxidation of acetone with selenium dioxide (U.S. Patent Specification 1,955,890) or by partial oxidation of propylene glycol with air in contact with copper catalysts (U.S. Patent Specification 2,339,347). In these processes two reaction steps are necessary to convert the readily available compound, i.e. acetone, into the desired acetals of methylglyoxal, and they involve extremely high expenditure and entail the inevitable loss of material.

It is an object of this invention to provide a process for the production of acetals of methylglyoxal using acetone as starting material which requires only one reaction step and with which good yields are achieved.

These and other objects are achieved in a process for the production of acetals of methylglyoxal which comprises reacting a mixture of acetone and an alcohol with a nitrosating agent in the presence of acid catalysts.

The new process according to the invention represents a great advance in the synthesis of acetals of methylglyoxal. It is surprising that it produces acetals of methylglyoxal in good yields, since hitherto the production of methylglyoxal by reaction of acetones with nitrosating agents has been regarded as impracticable [cf. Houben-Weyl-Müller, Methoden der organischen Chemie, vol. 7/1, p. 478 (1954)].

Pure acetone or crude technical-grade acetone may be used as starting material. In general, alcohols having 1 to 20 carbon atoms are suitable for the process according to the invention. Alkanols or alkanediols having up to 6 carbon atoms are preferred. Preferred alkanediols are those having the hydroxy groups attached to adjacent carbon atoms. Specific examples of such suitable alcohols are methanol, ethanol, propanol, butanol, octanol, dodecanol, ethylene, glycol and 1,2-propylene glycol.

Suitable nitrosating agents are nitrous acid and substances which are readily converted into nitrous acid under the reaction conditions, such as dinitrogen trioxide and alkyl nitrites, particularly those whose alkyl group contains 1 to 6 carbon atoms, e.g. methyl nitrite, ethyl nitrite and amyl nitrite. Alkyl nitrites which are derived from the alcohol used in the reaction are preferred.

In general, strong inorganic or organic acids or Lewis acids are used as acid catalysts. The essence of the invention does not reside in the choice of specific catalysts. All acid catalysts suitable for organic reactions, particularly etserifications, (cf. Houben-Weyl-Müller, Methoden der organischen Chemie, vol. 4/2 (1955), pages 5–59) can be used. Halogen hydro acids such as hydrogen chloroide and hydrogen bromide, are preferred. Particularly suitable Lewis acids are metal halides, which form hydrogen halides upon hydrolysis, such as zinc chloride, aluminum chloride and iron (III) chloride.

The molar ratios in which the reactants are used may vary within wide limits. In general, 0.2 to 20, particularly 0.5 to 7, moles of alcohol and 0.1 to 2.5, particularly 0.5 to 2.0, moles of nitrosating agent are used per mole of acetone. The catalyst is generally used in an amount of 1 to 10% by weight with reference to the mixture of the reactants. The reaction is carried out in general without using solvents since the acetone, which may if desired be used in excess, or the alcohol serves as solvent. If solvents are used it is advantageous to choose those which are inert both to the nitrosating agent and to the catalyst, e.g. aliphatic, cycloaliphatic or aromatic hydrocarbons or halohydrocarbons or carboxylic esters. Specific examples are pentane, hexane, octane, benzene, toluene, xylene, methylene chloride, chloroform, carbon tetrachloride, dichloroethane, methyl acetate, ethyl acetate and methyl propionate. The solvent is generally used in an amount 0.1 to 10 times, particularly 0.3 to 3 times, the weight of the mixture of acetone and alcohol.

It is advantageous to continuously remove water formed during the reaction, for example by entrainment with the solvent, such as pentane. In this way the yield of acetal is increased.

The reaction may be carried out within a wide temperature range, approximately between 0° and 150° C., preferably between 20° and 80° C. It is advantageously carried out at the boiling point of the reaction mixture since under these conditions the heat of reaction can be readily removed by evaporative cooling. The mixture may be adjusted to any boiling temperature within a wide range by adding inert solvents. In general, the reaction is carried out at atmospheric pressure, but it is also possible to use subatmospheric pressure, e.g. 100 to 500 mm. Hg, or superatmospheric pressure, e.g. up to 10 atmospheres gauge.

The process may be operated batchwise, the nitrosating agent advantageously being slowly introduced into the mixture of acetone, alcohol and catalyst, at the same rate at which the reaction proceeds, or continuously, in which case the reactants and the catalyst are for example metered continuously into a reactor provided with an overflow.

Processing is carried out in conventional manner by distillation, advantageously after the catalyst has been destroyed by neutralization. It is also possible to isolate the acetal formed by adding water to the reaction mixture, extracting the reaction mixture with a water-immiscible solvent, e.g. benzene or methylene chloride, and subsequently distilling the organic phase. The high boiling fraction obtained in the distillation contains 1,1,2,2-tetra-alkoxypropane in addition to alkyl α,α-dialkoxypropionate. 1,1,2,2-tetraalkoxypropane can be easily saponified to form an acetal of methylglyoxal by heating with dilute, aqueous acid.

Acetals of methylglyoxal are, inter alia, intermediates for vitamin A synthesis (cf. British patent specification 1,037,751).

In the following examples parts are by weight if not otherwise stated. Parts by volume, bear the same relation to parts by weight as the milliliter to the gram.

Example 1

Methylglyoxal dimethylacetal:
1,100 parts of methyl nitrate (1.16 moles per mole of acetone) is introduced in gaseous form and at a rate of about 50,000 parts by volume per hour into a mixture of 900 parts of acetone, 300 parts of methanol (0.6 mole per mole of acetone) and 100 parts of 36% aqueous hydrochloric acid. For better absorption, the mixture has been placed in a cylindrical reactor having a small diameter as compared with its height. The temperature of the reaction mixture begins to rise after a few minutes. It remains at 56° C. for a short period as a result of evaporative cooling, but in the course of the reaction it slowly rises to 62° C. After the introduction of gas has been completed, the reaction mixture, which has a yellow to orange color, is heated for another 15 minutes under reflux, cooled and neutralized with 20% caustic soda solution. In a column 1,200 parts of forerun is distilled off which in addition to 470 parts of acetone consists mainly of methanol. The residue is diluted with 500 parts by volume of water and extracted three times, each time with 400 parts by volume of methylene chloride. Upon distillation the organic layer gives 1,400 parts of methylene chloride, 20 parts of an intermediate cut having a boiling point of 43° to 58° C. at 760 to 50 mm. Hg, 305 parts of methylglyoxal dimethylacetal (55.2% of the theory with reference to the methanol used) having a boiling point of 58° to 62° C. at 50 mm. Hg and 54 parts of last runnings having a boiling point of 68° to 72° C. at 12 mm. Hg.

A similar result is obtained if 100 parts of 20 wt. percent aqueous hydrogen bromide or 10 parts of zinc chloride or 20 parts of aluminum chloride is used as catalyst instead of 100 parts of aqueous hydrochloric acid.

Example 2

Methylglyoxal dimethylacetal:
In the reactor described in Example 1 approximately 700 parts of nitrogen trioxide (0.77 mole per mole of acetone), which has been prepared from nitric oxide and oxygen in the volume proportion of 430; 108 in a mixer, is passed in the course of 6 hours into a mixture of 700 parts of acetone, 2,000 parts of methanol (5.22 moles per mole of acetone) and 53 parts of hydrogen chloride. Immediately after the gas supply has been opened the temperature begins to rise. The heat of reaction is removed by evaporative cooling, the temperature in the reaction vessel remaining at 55° to 60° C. When the reaction is over, the mixture is worked up as described in Example 1. Fractional distillation gives 330 parts of methylglyoxal dimethylacetal, 100 parts of last runnings and 210 parts of unreacted acetone.

Example 3

Partial hydrolysis of the last runnings obtained in the preparation of methylglyoxal dimethylacetal:
1,000 parts of last runnings having a content of 40% of 1,1,2,2-tetramethoxypropane is mixed with 50 parts of 0.1 N sulfuric acid and heated at 55° to 60° C. for 30 minutes. Fractional distillation of the mixture which has been neutralized with methanolic sodium methylate solution gives 250 parts of methylglyoxal dimethylacetal having a boiling point of 58° to 63° C. at 50 mm. Hg in addition to a forerun of methanol. 520 parts of methyl α,α-dimethoxypropionate having a boiling point of 60° to 62° C. at 10 mm. Hg (purity about 90%) is obtained as another fraction.

Example 4

Methylglyoxal diethylacetal:
500 parts of ethyl nitrite is introduced in gaseous form in the course of 4 hours into a mixture of 300 parts of ethanol, 400 parts of acetone and 20 parts of hydrogen chloride in a reactor equipped with a stirrer. The temperature is maintained at 50° C. by cooling. Processing is carried out as described in Example 1 and gives 158 parts of methylglyoxal diethylacetal having a boiling point of 50° to 52° C. at 10 mm. Hg. 206 parts of acetone are recovered.

Example 5

Methylglyoxal dipropylacetal:
200 parts of acetone and 20 parts of hydrogen chloride are placed in a reactor as described in Example 4. A mixture of 333 parts of n-propyl nitrite and 160 parts of n-propanol is added slowly and the reaction temperature is kept at 56° to 60° C. The reaction mixture is worked up as described in Example 1. Fractional distillation gives 115 parts of methylglyoxal dipropylacetal having a boiling point of 70° to 73° C. at 10 mm. Hg. 85 parts of acetone are recovered.

Example 6

Methylglyoxal dibutylacetal:
476 parts of n-butyl nitrite is added to a mixture of 200 parts of acetone, 200 parts of n-butanol and 20 parts of hydrogen chloride at a temperature of 60° to 65° C. with cooling. When the reaction mixture is worked up by the method described in Example 1, 57 parts of acetone is recovered. Fractional distillation gives 157 parts of methylglyoxal dibutylacetal having a boiling point of 72° to 73° C. at 1 mm. Hg.

Example 7

500 parts of methyl nitrite in gaseous form is introduced, in the course of 3 hours with stirring and while cooling the solvent under reflux, into a mixture of 1,000 parts of methylene chloride, 500 parts of methanol, 350 parts of acetone and 30 parts of hydrogen chloride at 40° to 45° C. During the reaction another 5 parts of hydrogen chloride is passed in. The amount of off-gas formed ($N_2O$) is 90,000 to 95,000 parts by volume. The reaction mixture is neutralized with 50 wt. percent caustic soda solution at 20° C. without being previously heated, and processing is carried out as in Example 1. The forerun contains 135 parts of acetone in addition to methylene chloride and methanol. 187 parts of methylglyoxal dimethylacetal is isolated. Another 30 parts of this compound is obtained by saponification of 50 parts of 1,1,2,2-tetramethoxypropane isolated as last runnings.

Example 8

The procedure of Example 7 is followed except that chloroform is used instead of methylene chloride. 131 parts of acetone is recovered. The total yield of methylglyoxal dimethylacetal is 203 parts, 25 parts of which is obtained by saponification of 1,1,2,2-tetramethoxypropane.

Example 9

The procedure of Example 7 is followed except that carbon tetrachloride is used instead of methylene chloride. 140 parts of acetone is recovered. 195 parts of methylglyoxal dimethylacetal is isolated; of this amount 26 parts is obtained by saponification of 1,1,2,2-tetramethoxypropane (46 parts).

Example 10

The procedure of Example 7 is followed except that methyl acetate is used instead of methylene chloride. 140 parts of acetone is recovered. 246 parts of methylglyoxal dimethylacetal is isolated. 35 parts of which is obtained by saponification of 1,1,2,2-tetramethoxypropane (59 parts).

We claim:
1. A process for the production of acetals of methylglyoxal which comprises admixing at a temperature in the range of 0 to 150° C. a mixture of acetone and an alcohol selected from the group consisting of alkanols and alkanediols with a nitrosating agent selected from the group consisting of nitrous acid, nitrogen trioxide and alkyl nitrites having from 1 to 6 carbon atoms in the presence of an acid catalyst.

2. A process as claimed in claim 1 wherein an alkanol having from 1 to 20 carbon atoms is used.

3. A process as claimed in claim 1 wherein said alcohol is an alkanol having 1 to 6 carbon atoms.

4. A process as claimed in claim 1 wherein said alcohol is an alkanediol having 1 to 6 carbon atoms.

References Cited

UNITED STATES PATENTS 2,995,573   8/1961   Stansbury _____ 260—94

OTHER REFERENCES

Manning et al. (I): "J. Am. Chem. Soc.," vol. 81, pp. 4885 to 4890 (1959). QD1.A5.

Manning et al. (II): "J. Org. Chem.," vol. 28, pp. 1673 to 1675 (1963). QD241.J6.

Raphael et al.: "Adv. in Org. Chem.," vol. 3, pp. 261 to 264 (1963). QD251.A3.

Adams et al.: "Org. Reactions," vol. VII, pp. 328 to 331 and 358 (1953). QD251.O7.

LEON ZITVER, Primary Examiner

M. M. JACOB, Assistant Examiner

U.S. Cl. X.R.

260—484, 594, 615